United States Patent

[11] 3,607,541

| [72] | Inventor | Francis Tombrel |
| | | Saint-Gratien, France |
| [21] | Appl. No. | 650,366 |
| [22] | Filed | June 30, 1967 |
| [45] | Patented | Sept. 21, 1971 |
| [73] | Assignee | Societe Le Carbone Lorraine |
| | | Paris, France |
| [32] | Priority | Feb. 27, 1967 |
| [33] | | France |
| [31] | | 96228 |

[54] PROCESS FOR PRODUCING PYROLYTIC CARBON IMPREGNATED THERMAL INSULATING CARBONIZED FELT
6 Claims, 2 Drawing Figs.

[52] U.S. Cl. ..................................................... 156/280,
23/209.4, 23/209.6, 117/106, 117/226, 156/327,
161/182, 161/260, 252/62, 252/502
[51] Int. Cl. .................................................... C09j 5/00,
C10b 49/00, F16l 59/00
[50] Field of Search ........................................... 161/182,
260, 249, 265; 156/327, 280; 252/62, 502;
23/209.4–209.6; 60/200, 35.6; 117/226, 46, 106,
144

[56] References Cited
UNITED STATES PATENTS

| 3,317,338 | 5/1967 | Batchelor | 117/46 |
| 3,492,197 | 1/1970 | Olstowski et al. | 252/502 X |
| 3,503,118 | 3/1970 | Criscione et al. | 161/182 X |
| 3,513,014 | 5/1970 | Kiyoshi | 117/226 X |
| 1,963,554 | 6/1934 | McDill | 117/226 X |
| 2,121,463 | 6/1938 | Wisdom | 23/209.4 |
| 2,473,183 | 6/1949 | Watson | 219/46 |
| 2,853,969 | 9/1958 | Drewett | 117/226 X |
| 3,174,895 | 3/1965 | Gibson et al. | 161/259 |
| 3,179,605 | 4/1965 | Ohsol | 252/502 |
| 3,187,089 | 6/1965 | Cosby et al. | 174/94 |
| 3,187,502 | 6/1965 | Stover | 161/182 X |
| 3,203,849 | 8/1965 | Katz et al. | 161/96 |
| 3,275,488 | 9/1966 | Bailey et al. | 156/89 |
| 3,399,969 | 9/1968 | Bokros et al. | 117/226 X |

*Primary Examiner*—Harold Ansher
*Attorney*—Holcombe, Wetherill & Brisebois

ABSTRACT: For high-temperature thermal insulation, e.g., for rockets or missiles, a low density carbon felt assembly of carbonized viscose rayon felt is appropriately shaped and subjected to pyrolysis with a gas-containing chemically combined carbon, e.g., methane, at a reduced pressure and at low or high temperatures, e.g., 1,800° C.

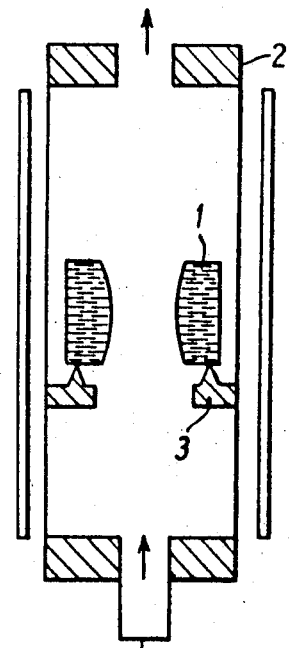
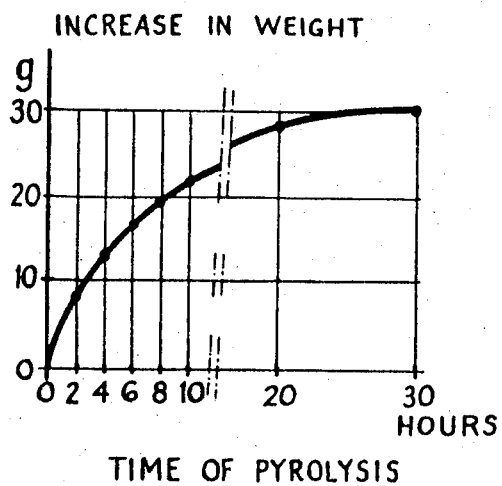
Fig.2
Fig.1

PROCESS FOR PRODUCING PYROLYTIC CARBON IMPREGNATED THERMAL INSULATING CARBONIZED FELT

A thermal insulation material is made from a carbon felt assembly impregnated by pyrolytic carbon produced from a gas, such as methane under reduced pressure.

The present invention related to thermal insulation material and to a method for its manufacture.

Modern techniques involve the use of materials at higher and higher temperatures and, in consequence, the consideration of thermoinsulating compositions proves to be more and more exacting. It is true, for example, with regard to certain shaped members for rockets or missiles, throats for rocket nozzles, nosepieces of rockets, entry cones, etc.

It is an object of the present invention to provide an improved thermal insulation material.

A further object is to provide a method for the manufacture of said improved thermal insulation material.

Yet another object is to provide improved high-temperature resistant components for rockets or missiles.

According to the invention there is provided a thermal insulation material comprising a carbon felt assembly, said assembly being impregnated by pyrolytic carbon produced from a containing chemically combined carbon gas.

The carbon felt assembly may be prefabricated into a predetermined shape prior to being impregnated by the pyrolytic carbon.

The carbon felt assembly is of the type described in copending application of Roland Cauville et al. Ser. No. 650,191 filed June 30, 1967 for Carbon Felt Assembly for Thermal Insulation and Method for its Manufacture. These assemblies are insulating materials from sheets or plates of pure viscose rayon which are glued with a thermohardening resin, the assembly being polymerized and carbonized at 900° C. to 1,200° C. or even from leaves or sheets of the same nature but carbonized prior to their gluing, these two processes being able to be treated at graphitation temperatures of 2,400°–3,000 C. This thermally insulating carbon felt material lends itself particularly well to the fabrication of members of predetermined shape by suitable machining, which members of particular shapes are reinforced by the complementary treatment according to the present invention. Rocket nozzles, throats, rocket noses, entry cones of rockets or missiles, and the like being obtained by cutting and machining, which presents no particular difficulty.

This complementary treatment is specifically a treatment by pyrolysis, by cracking with a gas, $CH_4$, for example, at low or at high temperature.

In order that the invention may be better understood, one embodiment thereof is described below purely by way of illustrative but nonlimiting example, with reference to the accompanying drawings in which:

FIG. 1 shows schematically a pyrolytic treatment furnace for carrying out the method according to the invention; and FIG. 2 shows a graph of the pyrolysis step in the method according to the invention.

EXAMPLE

As described in the aforementioned copending application, the raw materials are felt made of pure viscose rayon and adhesive constituted by a furane resin including 1 percent catalyst.

To obtain a platelike assembly there are used layers of felt with a thickness of 25 to 35 mm. whose weight per square meter is 6 kg. Each layer is coated with the thickened resin (about 0.2 g./cm.$^2$) i.e., in small amounts relative to the weight of the viscose rayon. A certain number of layers is stacked, then a light pressure (about 5 g./cm.$^2$) is applied and the stack is left to polymerize for about 5 days at ambient temperature.

The assembly is then placed in a metal or refractory crucible, and carbonized at a final temperature of 1,100° C., the rate of temperature rise being from 3° to 30° C. per hour. The shrinkage during the carbonization is of the order of 25 to 30 percent. The resin and the felt have a shrinkage of the same order of magnitude.

In the case of manufacturing a sleeve, a felt is used with a thickness of 14 to 15 mm., whose weight per square meter is from 2 to 4 kg. The felt, internally coated with resin, is wound on a shape, a cardboard tube for example. It is pressed lightly then polymerized and carbonized.

A modification to the above-described process consists in starting with layers of felt which has already been carbonized. Then the adhesive is deposited solely at small localized zones, so as not to load the felt too much with resin and consequently coke. The assembly is carbonized as previously.

A rocket throat 1 constituted of carbon felts glued and treated, as indicated previously, is placed in a vertical pyrolytic treatment furnace 2.

The member has, for instance, a diameter of 130 mm. and a height of 110 mm. the throat properly so called has a diameter of 40 mm. It is kept in place in the furnace by a tripod of carbon 3 (FIG. 1).

The member is brought either under vacuum, or under reduced pressure to the temperature selected for pyrolysis which is here about 1,800° C. There is then introduced into the furnace at this temperature a gaseous mixture, constituted by nitrogen and methane, which circulates under reduced pressure. By way of illustration, the mixture is 65 1/h (N.T.P) of methane
235 1/h (N.T.P) nitrogen.

The pressure is maintained at 10 mm. by means of a vacuum pump.

The member is impregnated with carbon from cracking in the course of time and the increase in weight as a function of time is noted (FIG. 2). It is 5 grams per hour at the beginning and in the neighborhood of 0.5/per hour at the end of 10 hours of treatment. This is due to progressive filling in of the interstices between fibers by the carbon deposit. In limiting the time of pyrolysis to 10 hours the deposit is almost solely in the mass. In prolonging it 20 to 30 hours, the deposit is continued principally at the surface.

At one or the other stage the deposit obtained can be machined without particular difficulty by milling or by turning.

It will be apparent that various changes and modifications may be made in the example described above without departing from the scope of the invention.

I claim:

1. A process for producing a pyrolytic carbon impregnated thermal insulating carbonized viscose rayon felt laminate comprising forming a carbonized viscose rayon felt laminate having a density less than 0.485 g./cm.$^3$ by forming a laminate having a plurality of layers of viscose rayon felt bound together by a carbonizable thermosetting resin, applying a very light pressure of about 5 g./cm.$^2$ to said laminate layers, polymerizing said thermosetting resin and carbonizing said laminate at a temperature of 900°–1,200° C., then impregnating said laminate with pyrolytic carbon produced by the pyrolysis of a gas-containing chemically combined carbon.

2. A process according to claim 1 wherein the said gas in methane.

3. A process according to claim 1 wherein said gas is a mixture of nitrogen and methane under reduced pressure.

4. A process according to claim 3 wherein pyrolytic carbon is deposited within the laminate at the rate of 5 grams/hour at the commencement of pyrolysis decreasing to 0.5 grams/hour at the end of the pyrolysis.

5. A process according to claim 3 wherein the time of pyrolysis is 10–30 hours.

6. A process according to claim 3 wherein the carbonized assembly is graphitized at 2,400°–3,000° C.

UNITED STATES PATENT OFFICE
CERTIFICATE OF CORRECTION

Patent No. 3,607,541     Dated September 21, 1971

Inventor(s) Francis Tombrel

It is certified that error appears in the above-identified patent and that said Letters Patent are hereby corrected as shown below:

[32] Priority Feb. 23, 1967

Signed and sealed this 14th day of March 1972.

(SEAL)
Attest:

EDWARD M. FLETCHER, JR.          ROBERT GOTTSCHALK
Attesting Officer                Commissioner of Patents